Dec. 30, 1952 A. TREFF 2,623,677
HEATED PLUNGER STRUCTURE FOR MEAT FILLING MACHINES
Filed June 20, 1945 3 Sheets-Sheet 1
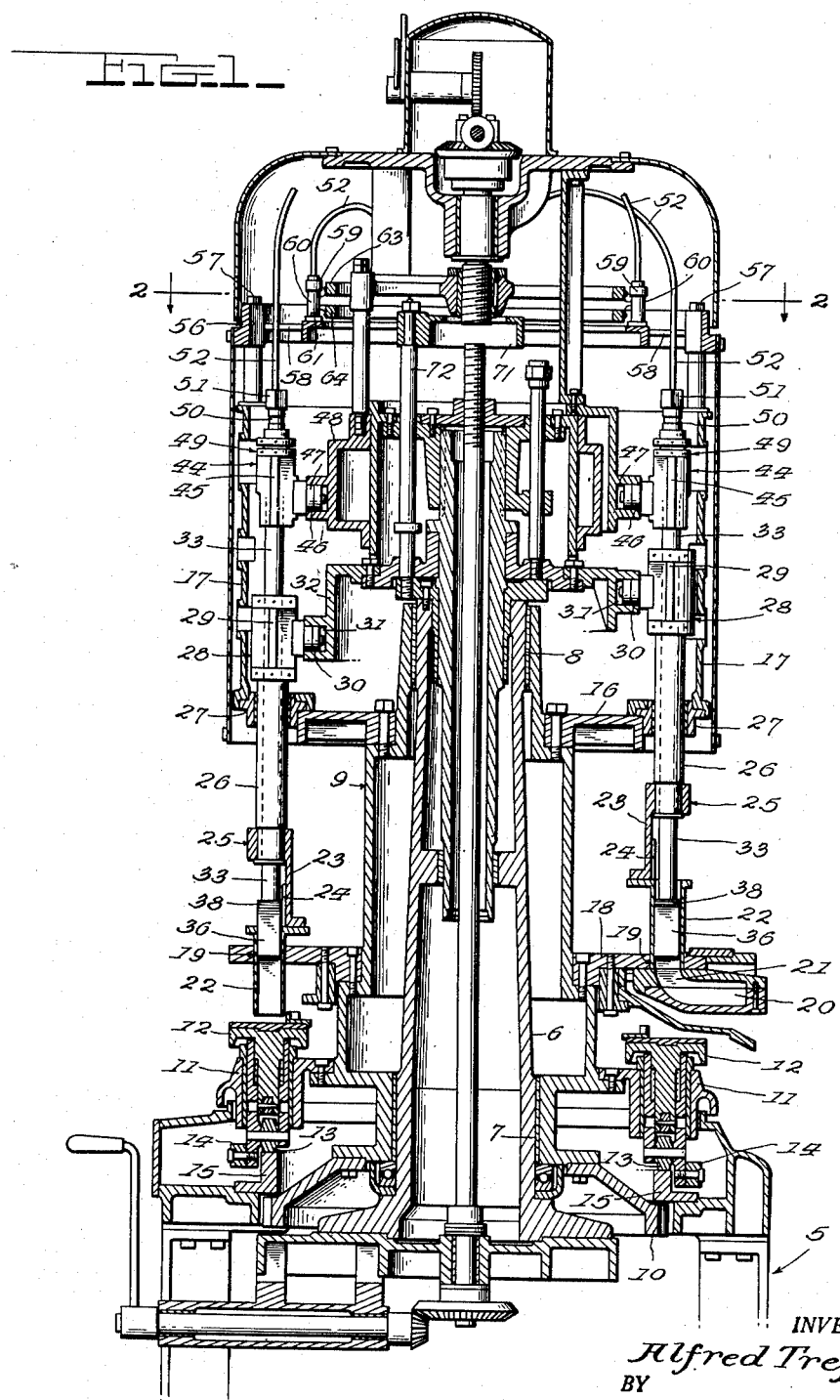
INVENTOR.
Alfred Treff
BY
Mason, Porter & Diller
Attys.

Dec. 30, 1952 A. TREFF 2,623,677
HEATED PLUNGER STRUCTURE FOR MEAT FILLING MACHINES
Filed June 20, 1945 3 Sheets-Sheet 2
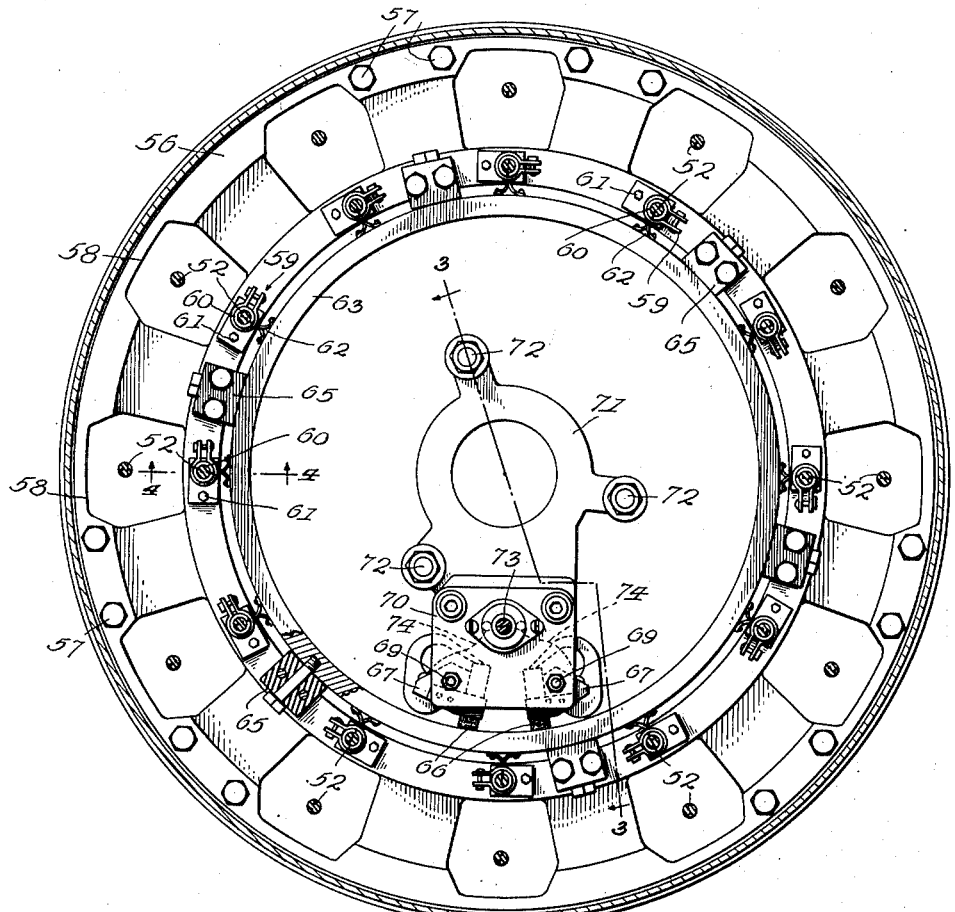
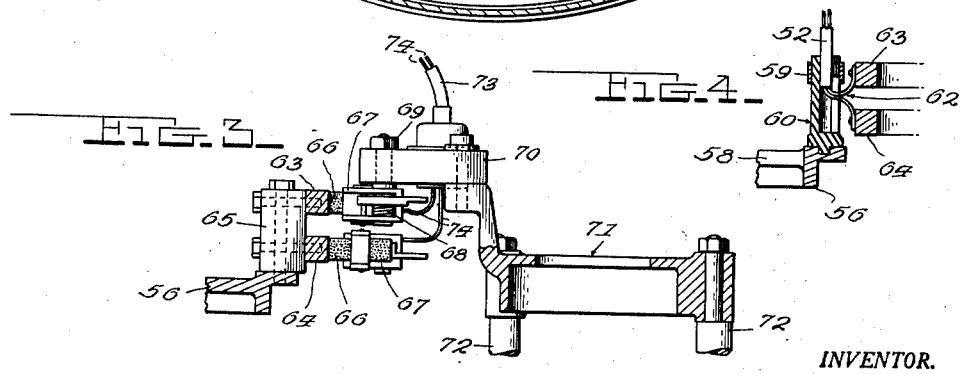
INVENTOR.
Alfred Treff
BY
Mason, Porter & Diller
Attys.

Dec. 30, 1952 A. TREFF 2,623,677
HEATED PLUNGER STRUCTURE FOR MEAT FILLING MACHINES
Filed June 20, 1945 3 Sheets-Sheet 3
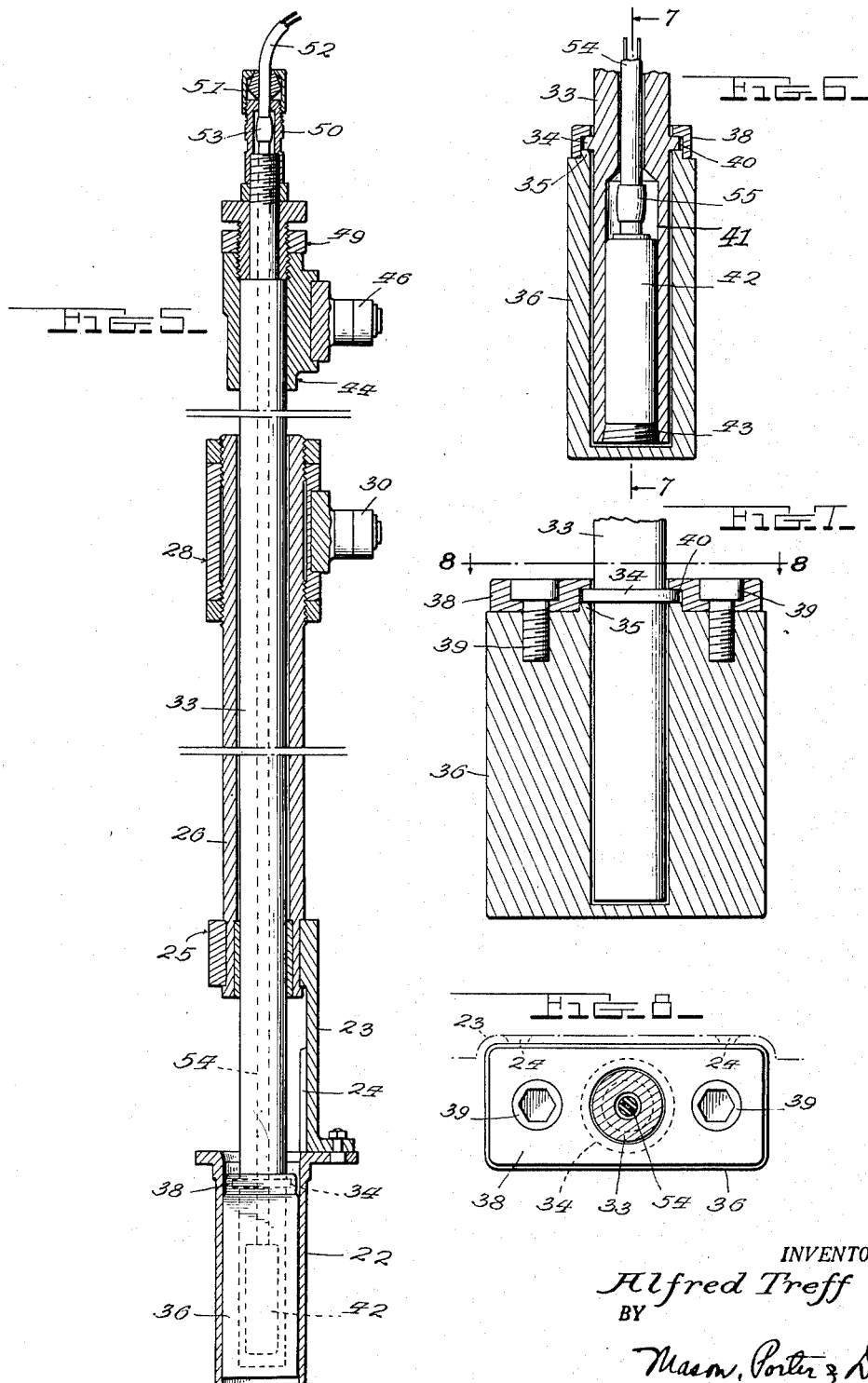
INVENTOR.
Alfred Treff
BY
Mason, Porter & Diller
Attys.

Patented Dec. 30, 1952

2,623,677

UNITED STATES PATENT OFFICE 2,623,677

HEATED PLUNGER STRUCTURE FOR MEAT FILLING MACHINES

Alfred Treff, Chicago, Ill., assignor to Continental Can Company, Inc., New York, N. Y., a corporation of New York Application June 20, 1945, Serial No. 600,462

6 Claims. (Cl. 226—96)

1

The invention relates generally to filling machines, and more particularly to meat filling machines of the type disclosed in the copending application for U. S. Letters Patent filed by Paul E. Pearson and Alfred Treff on July 23, 1943 and identified by Serial Number 495,886, now Patent No. 2,433,061, dated December 23, 1947, and it primarily seeks to provide in a machine of the character stated novel plunger structures which are heated in a manner for preventing sticking of the meat thereto during the filling of the meat into the cans.

In meat filling machines the mass of meat to be filled into the cans is refrigerated and delivered into a form or container from which it is forced by a reciprocating plunger into a can placed in position to receive a fill of the meat. Some difficulty has been experienced in the operation of machines of this type because of the tendency of the meat fill forced into a can by the plunger to stick to the plunger and be partially drawn out of the can as the plunger is retracted. This drawing out of a portion of the meat fill may in some cases interfere with the filling of uniform charges into the cans, and the drawn out portions of meat fill also tend to interfere with sanitary and efficient sealing of the cans by the usual application and seam-securing of metal end closures thereon. This sticking of the meat fill to the plungers is thought to have been caused in a large measure by the fat content in the meat fill, it having been observed that the problem of sticking is aggravated when the meat fill includes a high percentage of fat, and it has been found that by forcing the meat fill into the cans by use of a plunger maintained at an elevated temperature, the problem of sticking can be substantially eliminated.

Therefore, it is an object of the invention to provide in a machine of the character stated wherein are provided means for supporting the cans to be filled, and meat charge receiving forms associated with the supporting means all supported on and rotatable with a turret structure, means for delivering meat charges into said forms, and novel reciprocable plungers and heating means therefor movable with the turret, said plungers being effective to aid in measuring the meat charges and also for forcing said charges from the forms into the cans without any substantial withdrawal of meat charge portions through the open tops of the cans incidental to the retraction of the plungers from the cans.

Another object of the invention is to provide

2 in a machine of the character stated plungers which are heated by electrical resistance heater elements removably mounted therein and which have connected thereto leads arranged to readily flex as the plungers are reciprocated, said leads being connected with collector rings rotatable with the turret structure, and the current for the heater elements being supplied to the collector rings through stationarily mounted brushes from a suitable source of supply.

Another object of the invention is to provide novel means for mounting the heated plungers on the elements which carry and reciprocate them, said mounting means permitting a limited amount of movement of the plungers relative to the carrier elements effective to make the plungers self aligning and not subject to binding during movement in the forms.

With the above and other objects in view that will hereinafter appear, the nature of the invention will be more clearly understood by reference to the following detailed description, the appended claims, and the several views illustrated in the accompanying drawings.

In the drawings:

Figure 1 is a central vertical cross sectional view taken through the turret structure of a filling machine embodying the invention.

Figure 2 is a horizontal section taken on the line 2—2 on Figure 1.

Figure 3 is an enlarged fragmentary vertical cross sectional view taken on the line 3—3 on Figure 2.

Figure 4 is an enlarged fragmentary vertical cross sectional view taken on the line 4—4 on Figure 2.

Figure 5 is an enlarged detail vertical longitudinal section illustrating the mounting of one of the heated plungers.

Figure 6 is an enlarged detail vertical cross sectional view illustrating one of the heated plungers.

Figure 7 is a vertical cross section taken on the line 7—7 on Figure 6.

Figure 8 is a horizonal section taken on the line 8—8 on Figure 7.

While the invention is herein disclosed as incorporated in the type of meat filling machine shown in the copending application for U. S. Letters Patent hereinbefore referred to, it is to be understood that the improved heated plunger structures and the mounting and current supplying means therefor may be incorporated in machines of other types and design.

In the example of embodiment of the invention herein disclosed, 5 designates the base framing of the filling machine, and 6 a center column rigidly supported on said framing. The column 6 provides lower bearing as at 7 and upper bearing as at 8 for a turret structure generally designated 9.

The turret structure includes the driver gear portion 10 to which rotation is imparted in a manner not shown herein but which is clearly described in the previously mentioned copending patent application, and individual equidistantly spaced and uprightly disposed bearings 11 in which are mounted the can supporting pads 12 which support the cans in position to be filled and which are lifted and lowered by engagement of the rollers 13 and 14 thereof with lifting tracks 15 and with lowering track means not shown herein but which are shown and described in the above-mentioned copending patent application. See Figure 1.

The turret structure also includes an upper plate portion 16 whereon is mounted the uprightly disposed outer shell 17, and a lower plate portion 18 having an aperture 19 disposed over each of the can supporting pads 12, and through which the meat charge receiving forms are movable in the manner clearly illustrated in Figure 1. The lower plate portion 18 is slidable over the meat supply duct 20 disposed at the filling station, and said duct includes an upwardly directed discharge throat 21 through which the meat charges are extruded into the forms in the manner fully disclosed in the beforementioned copending patent application. The meat charge receiving forms, previously referred to and which are disposed to cooperate with the apertures 19 and the pads 12, are designated 22 and comprise hollow sleeves shaped to freely telescope into the cans supported on said pads. Each form is secured to the bottom of a carrier bracket 23 equipped with spaced guides 24, the purpose of which will later become apparent, and each said bracket is in turn secured, as at 25, to the lower end of a form carrying sleeve 26.

Each carrier sleeve 26 is vertically slidable in a bearing 27 supported on the upper plate 16, and has a cross head 28 secured to its upper end. Each cross head 28 is slide guided as at 29 and has a stud projecting radially inwardly therefrom and equipped with a roller 30 which engages in an actuator groove 31 formed in a cam 32, stationarily supported on the column 6. It will be apparent that as the turret structure is rotated about the column 6, the form carrying sleeves 26 will be vertically reciprocated. The lifted position of the forms is shown at the right in Figure 1, and a lowered position of the forms is illustrated at the left of said figure.

A hollow plunger carrying rod 33 is vertically slidable in each sleeve 26, and each said rod is provided with an annular rib 34 adjacent the lower end thereof. See Figures 5 to 8. Each plunger carried rod rib 34 is loosely received between the upstanding annular boss 35 of a plunger block 36 and the overhanging edge of a collar 38 secured by cap screws 39 to the top of the plunger block. Each plunger block is shaped to snugly telescope within the respective form 22, and the annular rib 34 of the respective carrier rod is so proportioned with respect to the chamber in which it is received between said block and the securing collar 38 as to provide side play as at 40 so as to permit a limited amount of movement of the block 40 relative to the carrier rod, thereby to make the plunger blocks self-aligning and not subject to binding in the forms during movement of the blocks therein. Each carrier rod 33 has a counterbore 41 in its lower end in which to receive an electrical resistance heater element 42, and the counterbore is closed by a removable, threadably mounted plug 43.

A cross head 44 is secured to the upper end of each rod 33 and is slide guided as at 45. Each of the cross heads is equipped with a radially inwardly projecting stud whereon is mounted a roller 46, and each roller engages in an actuator groove 47 in a cam 48 which is stationarily supported on the column 6. See Figure 1. It will be apparent that as the turret structure 9 is rotated, the plunger carriers 33 will be vertically reciprocated so as to at the proper time first admit forced introduction of meat fills into the forms 22, on the up stroke of the plungers, and then, on the down stroke, to force said meat charges into the cans in the manner disclosed in the beforementioned copending patent application.

At its upper end each rod or carrier 33 is adjustably mounted as at 49 on the respective cross head 44 and is externally threaded to receive a casing member 50 on which is threadably mounted a gland cap 51 effective to prevent introduction of moisture into the casing member. See Figure 5. An electrical conductor lead 52 projects upwardly through the moisture sealing glad cap 51 and is spliced as at 53 within the casing member 50 to the upper end extremity of a conductor 54 extending downwardly through the hollow interior of the carrier rod 33, said conductor being in turn spliced as at 55 to the electrical resistance heater unit 42 within the block 36 supported thereby. See Figures 5 and 6.

A ring 56 is secured as at 57 atop the turret shell 17, and said ring is equipped with a plurality of equidistantly spaced openings 58 through which the individual leads 52 can project and flex during the vertical reciprocation of the carrier rods 33. See Figures 1 and 2. At the ends thereof remote from the spliced connections 53 within the casing members 50, the leads 52 are clamped as at 59 within housing members 60, the housing members 60 being secured in equidistantly spaced relation as at 61 on the inner portion of the ring 56.

The conductor wire ends extending from the end of the leads 52 into the housing members 60 are connected as at 62 to the upper and lower collector rings 63 and 64 which are secured through brackets 65 on the ring 56 so as to be rotatable with the turret structure 9. Carbon brushes 66 engage the collector rings 63 and 64 and are mounted in individual carriers 67 which are spring urged toward the collector rings as at 68 and supported as at 69 on a stationarily mounted bracket 70. See Figures 1 to 4. The bracket 70 is stationarily mounted in any approved manner, as on the ring 71 which is supported at the upper end of the rod standards 72. See Figures 2 and 3. Current is supplied to the brushes and through them to the collector rings and the connected heated plungers by a current supply line 73 having its wires 74 individually connected to the brush carriers in the manner clearly illustrated in Figures 2 and 3.

Throughout the operation of the filling machine, the individual plunger blocks 36 are maintained at an elevated temperature which preferably is not much above room temperature, and by this means sticking of meat of the meat fills to the plungers as they are being retracted after forcing the meat fills into the cans is avoided.

As has been explained hereinabove, the novel plunger structures can be incorporated in machines of various forms, but when these plungers are incorporated in a machine structure as shown in part herein and as disclosed in detail in the beforementioned copending patent application, the filling cycle may be said to start with a form sleeve 20 disposed in registry over the meat fill discharging mouth 21 at the filling station and with its lower edge extremity flush with the bottom of the plate 18. The lower extremity of the respective heated plunger block 36 also should be flush with the bottom of the plate 18. While the unit is moving over the discharge opening 21 the form sleeve 22 is held against vertical movement while the heated plunger block 36 moves upwardly, and the meat will be extruded from the duct 20 and through the outlet 21 into the form sleeve beneath the rising plunger. When the heated plunger has reached the top limit of its stroke, a full charge of meat will have been received in the form sleeve 22 and the passage of the sleeve over the manifold at the fill station will slice the meat fill off cleanly flush with the bottom end of the form sleeve.

The particular, charged form sleeve next comes over a can accurately supported therebeneath on the respective pad 12, and while the form sleeve and said can are moving in aligned relation, the form sleeve and the heated plunger are moved together into the can until the lower end of the sleeve is spaced only slightly above the closed bottom of the can. At this time downward movement of the form sleeve is stopped while the heated plunger continues to move downwardly a limited distance to force the meat fill into the bottom of the can and beneath the lower edge of the form sleeve 22. Thereupon, the form sleeve is retracted or moved upwardly until its bottom end comes flush with the bottom end of the heated plunger block 36, the meat fill being held down in the can while this retraction of the form sleeve progresses, and then the form sleeve and the plunger block is moved downwardly together a short distance to securely pack the meat fill in the can. The meat fill having been thus securely packed in the can, the form sleeve 22 and the heated plunger 36 are moved upwardly together until their lower ends are flush with the bottom of the plate 18 in readiness to again pass over the charged manifold duct 20 and perform another measuring and filling operation.

By reason of the heating of the plunger blocks 36, sticking of the meat fill to said blocks is avoided and portions of the meat fill are not withdrawn upwardly with the plunger into position for interfering with subsequent closure of the cans, or in a manner for disrupting the uniformity of the fills in the respective cans.

In the example of embodiment of the invention herein disclosed, the heater elements operate on approximately 90 volts and are rated at 700 watts. A transformer (not shown) may be used for controlling the voltage. Whenever it is desired to replace a heater element, the respective mounted collar 38 is disconnected by removal of the screws 39 so that the plunger block 36 may be moved downwardly from the lower end of the carrier rod 33, after which the plunger 43 is removed and the heater element 42 is moved downwardly out of the counterbore 41 by pushing down on the conductor 52 at the top of the machine.

While one form of the invention has been shown for purposes of illustration, it is to be clearly understood that various changes in the details of construction and arrangement of parts may be made without departing from the spirit and scope of the invention as defined in the appended claims.

I claim:

1. In a machine of the character described, can supporting means, a form in which to receive a charge of meat to be filled into a supported can, means for directing meat charges into said form, a reciprocable carrier, a plunger for forcing meat charges from said form into cans supported in alignment therewith, an electrical resistance heater attached to the plunger, said reciprocable carrier being hollow, and a current conductor connected to the heater and passing through the reciprocable carrier for attachment with a current source and free to flex with the movements of reciprocation of the carrier.

2. In a machine of the character described, can supporting means, a form in which to receive a charge of meat to be filled into a supported can, means for directing meat charges into said form, a reciprocable carrier, a plunger carried by said reciprocable carrier and effective to force meat charges from said form into cans supported in alignment therewith, said plunger having a self-aligning movement permitting mounting on said carrier, an electrical resistance heater attached to the plunger, said reciprocable carrier being hollow, and a current conductor connected to the heater and passing through the reciprocable carrier for attachment with a current source and free to flex with the movements of reciprocation of the carrier.

3. In a machine of the character described, can supporting means, a form in which to receive a charge of meat to be filled into a supported can, means for directing meat charges into said form, a reciprocable carrier rod having an annular rib near an end thereof, and a plunger block mounted on and depending from said rod end and embracing the rib in a manner permitting a limited amount of lateral play of the block relative to the rod end so that the plunger block can partake of self aligning movement in the form.

4. In a machine of the character described, can supporting means, a form in which to receive a charge of meat to be filled into a supported can, means for directing meat charges into said form, a reciprocable carrier rod having an annular rib near an end thereof, a plunger block mounted on and depending from said rod end and embracing the rib in a manner permitting a limited amount of lateral play of the block relative to the rod end so that the plunger block can partake of self aligning movement in the form, said carrier rod being hollow and having a counterbore in said end closed by a removable plug, an electrical resistance heater mounted in said counterbore, and a current conductor connected to the heater and passing through the reciprocable carrier rod for attachment with a current source and free to flex with movements of reciprocation of the carrier.

5. In a machine of the character described wherein is provided a rotary turret structure having thereon a plurality of equidistantly spaced can supporting pads, a form over each pad in which to receive a charge of meat to be filled into a pad supported can, and means for directing meat charges into the forms; a reciprocable plunger operable in each form for forcing meat charges from the form into a can therebeneath, an electrical resistance heater attached to each plunger, collector rings rotatable with the turret structure, flexible conductors electrically connecting the individual heaters with said rings, a current supply lead, and brushes electrically connecting the supply lead with said rings.

6. In a machine of the character described wherein is provided a rotary turret structure having thereon a plurality of equidistantly spaced can supporting pads, a form over each pad in which to receive a charge of meat to be filled into a pad supported can, and means for directing meat charges into the forms; a reciprocable hollow carrier rod centered over each form and supporting a plunger block having a loose couple on the rod for self aligning movement in the respective form and operable for forcing meat charges from the form into an underlying can, each said rod also having a counterbore extending into the block thereon, an electrical resistance heater in each counterbore, collector rings rotatable with the turret structure, flexible conductors electrically connecting the individual heaters with said rings, a current supply lead, and brushes electrically connecting the supply lead with said rings.

ALFRED TREFF.

REFERENCES CITED

The following references are of record in the file of this patent:

UNITED STATES PATENTS

| Number | Name | Date |
|---|---|---|
| 1,036,846 | Holden | Aug. 27, 1912 |
| 1,632,165 | Bergmann et al. | June 14, 1927 |
| 1,663,077 | Hallock | Mar. 20, 1928 |
| 1,859,562 | Huston | May 24, 1932 |
| 2,201,872 | Rottenberg | May 21, 1940 |
| 2,205,875 | Coffey et al. | June 25, 1940 |
| 2,256,770 | Armstrong | Sept. 23, 1941 |
| 2,336,415 | Nordquist et al. | Dec. 7, 1943 |